United States Patent
Pernyeszi

(10) Patent No.: US 6,275,405 B1
(45) Date of Patent: Aug. 14, 2001

(54) MOTOR DRIVE CIRCUIT

(75) Inventor: Joseph Pernyeszi, Scotts Valley, CA (US)

(73) Assignee: General Electronics Applications, Inc., Scotts Valley, CA (US)

( * ) Notice: Subject to any disclaimer, the term of this patent is extended or adjusted under 35 U.S.C. 154(b) by 0 days.

(21) Appl. No.: 09/458,217

(22) Filed: Dec. 9, 1999

Related U.S. Application Data

(60) Provisional application No. 60/111,879, filed on Dec. 11, 1998.

(51) Int. Cl.$^7$ .................................................. H02M 5/06
(52) U.S. Cl. ........................ 363/154; 363/150; 318/768
(58) Field of Search ....................... 363/154, 150, 363/144, 56, 53; 323/207; 318/768, 817, 800

(56) References Cited

U.S. PATENT DOCUMENTS

| | | | |
|---|---|---|---|
| 3,670,238 | * | 6/1972 | Ronk ..................................... 363/150 |
| 3,991,354 | | 11/1976 | Rosa et al. . |
| 4,079,446 | * | 3/1978 | Hertz ..................................... 363/150 |
| 4,706,174 | | 11/1987 | Schutten et al. . |
| 4,777,421 | | 10/1988 | West . |
| 5,235,504 | * | 8/1993 | Sood ..................................... 363/53 |

* cited by examiner

Primary Examiner—Rajnikant B. Patel
(74) Attorney, Agent, or Firm—Townsend and Townsend and Crew LLP

(57) ABSTRACT

A phase converter for converting single-phase power to three-phase power, wherein the single-phase power is provided at a first and a second single-phase power terminal and the three-phase power is provided to a first, a second and a third three-phase power terminal, the phase converter comprising: a first power transfer means for coupling the first single-phase power terminal to the first three-phase power terminal; a second power transfer means for coupling the second single-phase power terminal to the second three-phase power terminal; and an inverter coupled to receive power from the first and second single-phase power terminals. The inverter provides power to the third three-phase power terminal and a neutral output by phase shifting its input power by ninety degrees.

7 Claims, 3 Drawing Sheets

MOTOR DRIVE CIRCUIT

CROSS-REFERENCES TO RELATED APPLICATIONS

This application claims priority from a co-pending U.S. Provisional Patent Application No. 60/111,879, filed Dec. 11, 1998, the disclosure of which is incorporated in its entirety herein by reference.

FIELD OF THE INVENTION

The present invention relates generally to phase conversion, and more particularly, to an improved phase converter for converting single-phase power to three-phase power.

BACKGROUND OF THE INVENTION

Conventional techniques of generating 120-degree phase difference require expensive, complicated and less reliable controllers using microprocessors and associated electronics.

SUMMARY OF THE INVENTION

An improved phase converter for converting single-phase power to three-phase power is provided by one embodiment of the present invention. Single-phase power is provided at a first and a second single-phase power terminal and the three-phase power is provided to a first, a second and a third three-phase power terminal, the phase converter comprising: a first power transfer means for coupling the first single-phase power terminal to the first three-phase power terminal; a second power transfer means for coupling the second single-phase power terminal to the second three-phase power terminal; and an inverter coupled to receive power from the first and second single-phase power terminals. The inverter provides power to the third three-phase power terminal and a neutral output by phase shifting its input power by ninety degrees.

DESCRIPTION OF THE SPECIFIC EMBODIMENTS

Using the present invention, a three-phase induction motor, or the like, can be powered from a single-phase supply. The typical residential power grid typically provides for 120 VAC single-phase power and 240 VAC single-phase with a neutral line. For small household appliances, such as room air conditioners and refrigerators, the 120 VAC supply is used. For larger devices, such as central air conditioning and washing machines, the 240 VAC supply is often used. In either case, there is often a need or desire to use an efficient, three-phase motor. With the circuits shown here, such motors can be efficiently powered with available single-phase power.

Figure 1:
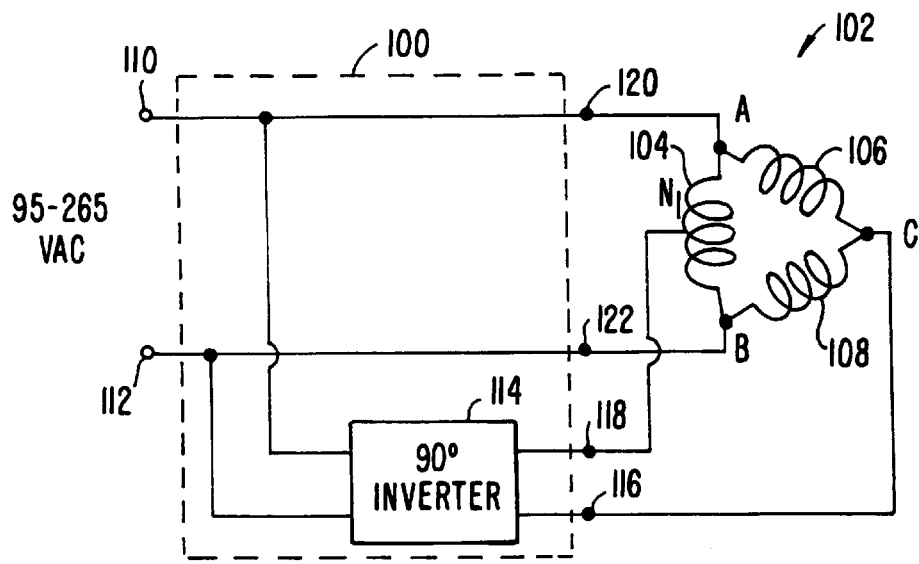
FIG. 1 is a schematic of a phase converter according to the present invention that uses a ninety-degree inverter.

FIG. 1 shows an embodiment 100 of the present invention. The embodiment 100 can convert a single phase power supply to three phase power to drive a three phase motor, such as motor 102. The embodiment 100 is suitable for use with single phase power input levels of 95–265 VAC, but in many applications 120 VAC input power is provided by a utility company. The motor 102 is shown having a delta configuration. In this configuration, motor windings 104, 106 and 108 are coupled together at motor terminals A, B and C to form the delta configuration. For example, the winding 104 is coupled to the winding 108 at terminal B.

The embodiment 100 has two input power terminals 110, 112 that are coupled to the single phase input supply from the utility company (typically 120 VAC). The input terminals 110, 112 are coupled to output terminals 120 and 122. A 90 degree inverter 114 is coupled between the input terminals 110, 112 and produces an output at output terminals 116 and 118. The output terminal 118 is coupled to motor terminal N, where N is the center point (center tap) of the winding 104. The output terminal 116 is coupled to the motor terminal C, the output terminal 122 is coupled to the motor terminal B and the output terminal 120 is coupled to the motor terminal A.

The inverter 114 produces an output voltage with a 90-degree phase difference with respect to the incoming phase. Thus, three phase power is provided and applied to the motor appropriately to result in three-phase balanced voltages applied on the three-phase windings of the motor.

In another embodiment of the invention, an inverter is used to take advantage of the way utility companies supply 240 VAC power; which is supplied as two 120 VAC components, 180 degrees out of phase, and a neutral. In this case, the power is supplied with a natural center tap (the neutral) and allows the use of standard three-phase motors in either delta or star winding configurations.

Figure 2A:
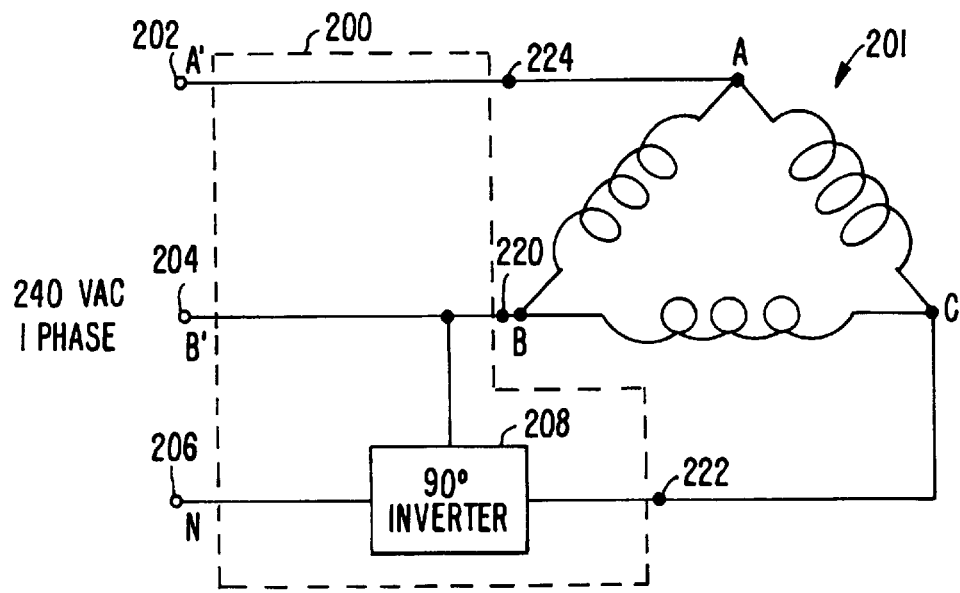
FIG. 2A is a diagram of a phase converter according to the present invention that uses a ninety-degree inverter.

FIG. 2A shows a diagram of embodiment 200 of the present invention for use with 240 VAC single phase power. The 240 VAC single phase input power is converted to three phase power for input to a motor 201, having a delta configuration. The input power is received at terminals 202, 204 and 206. The terminals 202 and 204 are coupled to the 240 VAC single phase AC supply (A', B') and the terminal 206 is coupled to the neutral (N).

A 90 degree phase inverter 208 is coupled to the input power and supplies current to one phase connection of the motor at coupled at output terminals 220, 222. Output terminal 224 is also coupled to the motor. A 90-degree voltage is generated by the inverter, which makes the control circuitry simple and inexpensive. Note that only about one half of the motor's power flows through the inverter, which allows the inverter to be one half the size required than if all the power flowed through the inverter. Conventional single-to three-phase converters typically carry the full power of the motor in the converter.

In the preferred embodiment, the 90 degree inverter 208 is packaged into a high-efficiency power module using advanced hybrid IC packaging techniques. This keeps the cost low, so that the converter described herein can be included in consumer applications such as air conditioners, refrigerators, washers and home furnace air handlers with minimal added cost. The size of the power module is also an issue, so advanced packaging techniques should be used to make a compact and durable product for dusty and humid environments. Reliability is another very important factor in designing power electronics in the intended applications. The power module should, therefore, incorporate fault diagnosis and lend itself to field repairs and include features such as bolt-on packaging, plug-in cable connectors, and possibly including visual display of fault status to aid in system troubleshooting.

Current high efficiency motor winding technology can be employed in the motor without any changes. Two different configurations are used, one for 120 VAC and another for 240 VAC. In the 120 VAC application, one of the three windings has a center tap. The 240 V application uses a standard, high-efficiency, three-phase motor.

Preferably, the power module would use loss reduction technology for further efficiencies, such as that developed by GEA, the assignee of the present application. With that loss reduction technology, the operation of the inverter can be at 22 kHz and above, so that the motor does not produce an annoying high-pitched sound that is unacceptable in homes. Very low noise is an important requirement in introducing any power electronics technology in household applications. In this power switching technology, the switching frequency is in the range of 22 to 30 kHz, which is outside the range of human hearing. Thus, the proposed system operates at a higher efficiency, without audible ill effects.

Figure 2B:
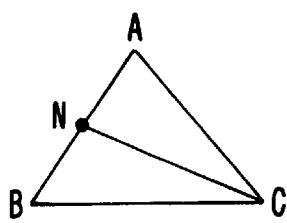
FIG. 2B is a vector diagram of the phase converter of FIG. 2A.

FIG. 2B shows a vector diagram associated with the phase converter shown in the embodiment 200 of FIG. 2A.

Figure 3:
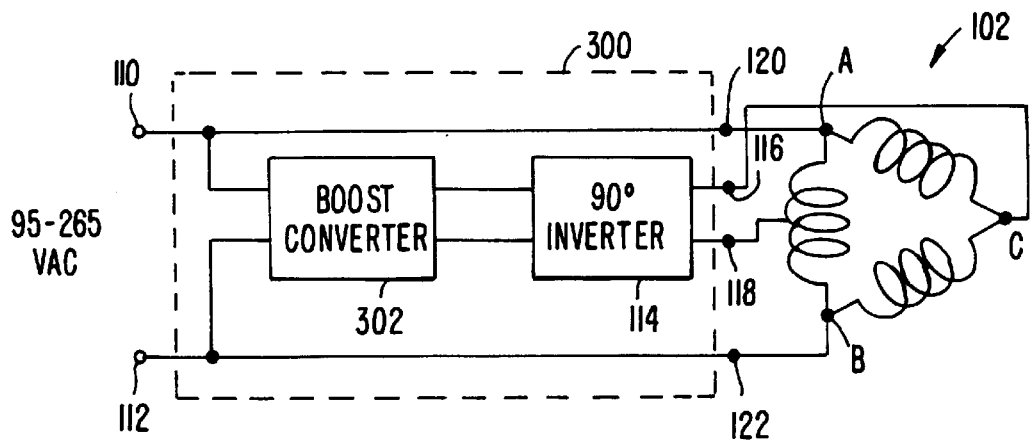
FIG. 3 is a schematic of a phase converter according to the present invention that uses a ninety-degree inverter and a boost converter.

FIG. 3 shows an embodiment 300 that is a variation of the embodiment 100, wherein a boost converter 302 is added prior to the inverter 114. The boost converter 302 improves the power factor of the unit to be closer to unity or even slightly leading to compensate for other lagging loads. This will decrease the total current, and hence losses, incurred in the utility company's system to supply the power drawn by the unit. The leading power factor is an advantage for the utility company and allows further savings due to better power generation and delivery efficiency.

Figure 4A:
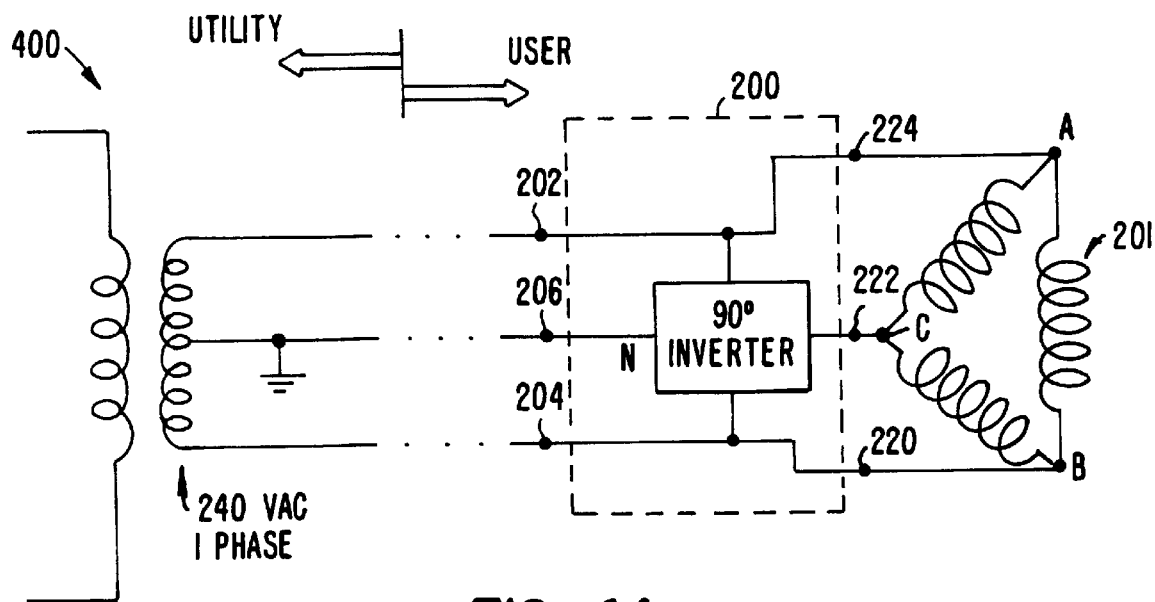
FIG. 4A is a schematic diagram of the phase converter of FIG. 2A coupled to a supply provided by a utility company.
Figure 4B:
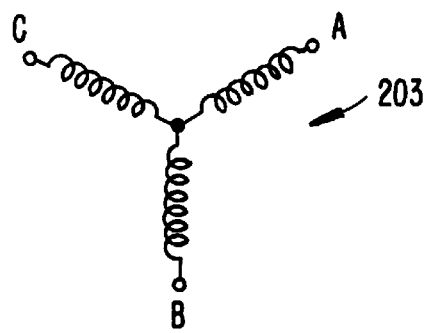
FIG. 4B is a motor having a star configuration that can be used in conjunction with the phase converter of FIG. 4A.

FIG. 4A shows a schematic diagram of the phase converter 200 of FIG. 2A coupled to a supply 400 provided by a utility company. The utility company provides 240 VAC single phase power that is coupled to the input terminals 202, 204 and 206. The motor 201 is shown as a delta configured motor, however, a star configured motor 203 as shown in FIG. 4B could be substituted without affecting the operation of the converter.

Figure 5:
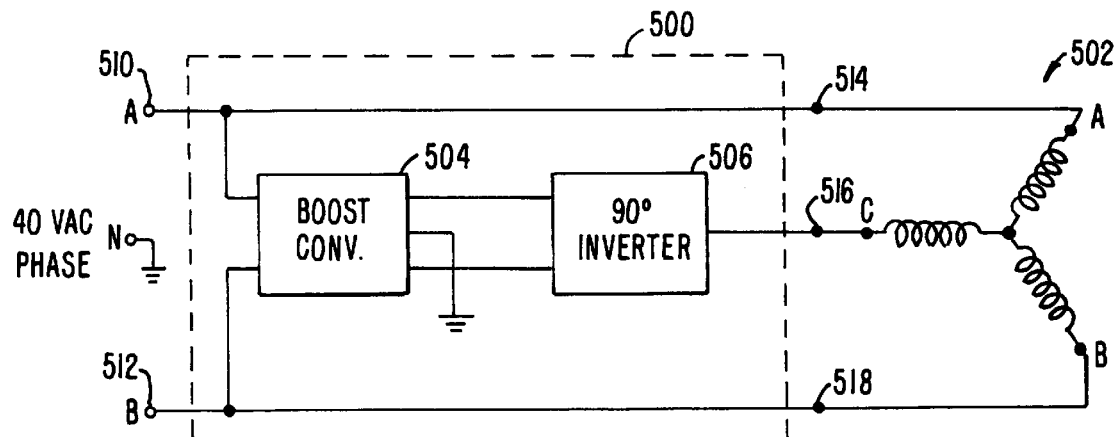
FIG. 5 is a schematic diagram of a phase converter according to the present invention that uses a ninety-degree inverter to drive a three phase motor that has a star configuration.

FIG. 5 is a schematic diagram of a phase converter 500 according to the present invention for converting 240 VAC single phase input power to three phase output power to drive a three phase motor 502 that has a star configuration. A boost converter 504 is coupled between input power terminals 510, 512 and a 90 degree phase inverter 506 to provide power conditioning to improve the power factor of the unit to be closer to unity or even slightly leading to compensate for other lagging loads. The 90 degree phase converter 506 has an output terminal 516 coupled to the motor 502 terminal C. The phase converter output terminals 514, 518 are couple to motor terminals A and B, respectively. Thus, the single phase input power is efficiently converted to three phase power to drive the motor.

Figure 6:
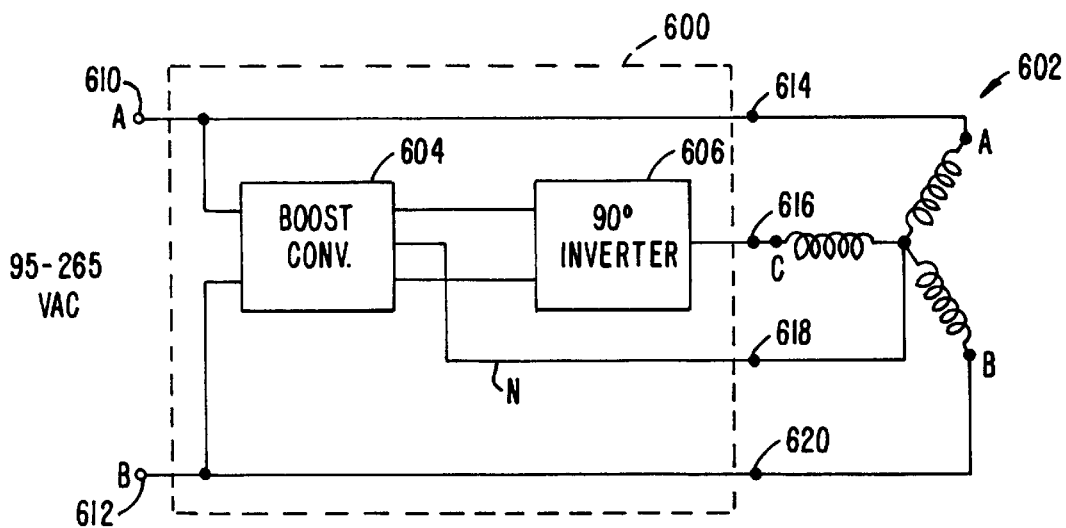
FIG. 6 is a schematic diagram of a phase converter according to the present invention that uses a ninety-degree inverter to drive a three phase motor that has a star configuration.

FIG. 6 is a schematic diagram of a phase converter 600 according to the present invention for converting a single phase power supply to drive a three phase motor 602 that has a star configuration. A boost converter 604 is coupled between input power terminals 610 and 612 and a 90 degree phase inverter 606 to provide power conditioning to improve the power factor to be closer to unity or even slightly leading to compensate for other lagging loads. The input power to the converter 600 can be in the approximate range of 95–265 VAC single phase power, although most typically, 120 VAC power would be used.

The 90 degree inverter 606 has an output terminal 616 couple to motor terminal C. The phase converter 600 also has output terminals 614, 618, and 620 coupled to drive the three phase motor 602. Thus, the single phase input power is efficiently converted to three phase power to drive the motor 602.

In summary, the phase conversion circuit proposed herein provides a simple, inexpensive and highly reliable analog controller to generate voltages with 90-degree phase differences, for use with devices that need three-phase power.

What is claimed is:

1. A solid-state phase converter for converting single-phase power to three-phase power, wherein the single-phase power is provided at a first and a second single-phase power terminal and the three-phase power is provided to a first, a second and a third three-phase power terminal, the solid-state phase converter comprising:

a first power transfer means for coupling the first single-phase power terminal to the first three-phase power terminal;

a second power transfer means for coupling the second single-phase power terminal to the second three-phase power terminal; and a solid-state inverter coupled to receive power from the first and second single-phase power terminals, the inverter including a first output terminal for coupling to the third three-phase power terminal and a second output terminal for coupling to a neutral output, wherein the neutral output is a center point between the first and second three-phase power terminals and wherein the power output from the first and second output terminals is shifted by ninety degrees from an input phase.

2. The solid-state phase converter of claim 1 further comprising a boost converter coupled between the first and second single-phase power terminals and the solid-state inverter.

3. The solid-state phase converter of claim 1 wherein the first power transfer means is a first wire connecting the first single-phase power terminal to the first three-phase power terminal and the second power transfer means is a second wire for coupling the second single-phase power terminal to the second three-phase power terminal.

4. A method of converting single phase power to three phase power to drive a motor having a first, a second and a third winding coupled together in a delta configuration, and wherein the first winding has a center tap and the second and third windings are connected to each other at a connection terminal, the method comprising steps of:

coupling the single phase power to the first winding;

coupling the single phase power to an input of a solid-state phase inverter, wherein the solid-state phase inverter has an phase inverter output that is phase shifted from the input; and coupling the solid-state phase inverter output to the center tap and the connection terminal.

5. The method of claim 4 wherein the step of coupling the single phase power to an input of a solid-state phase inverter comprises steps of:

coupling the single phase power to an input of a boost converter, wherein the boost converter has a boost converter output; and coupling the boost converter output to the input of the solid-state phase inverter, wherein the solid-state phase inverter has an phase inverter output that is phase shifted from the input.

6. A solid-state phase converter for converting single-phase power to three-phase power, wherein the single-phase power is provided at a first, a second and a third single-phase power terminal and the three-phase power is provided to a first, a second and a third three-phase power terminal, the solid-state phase converter comprising:

a first power transfer means for coupling the first single-phase power terminal to the first three-phase power terminal;

a second power transfer means for coupling the second single-phase power terminal to the second three-phase power terminal; and a solid-state inverter coupled to receive power from the first, second and third single-phase power terminals, the solid-state inverter including a first output terminal for coupling to the third three-phase power terminal, and wherein the power output from the output terminals is shifted by ninety degrees from an input phase.

7. A method of converting single phase power provided at a first, second and third single phase power terminals to three phase power to drive a motor having a first, second and third motor terminals, the method comprising steps of:

coupling the first single phase power terminal to the first motor terminal;

coupling the second single phase power terminal to the second motor terminal;

coupling the first, second and third single phase power terminals to a solid-state phase inverter, wherein the solid-state phase inverter has an phase inverter output that is phase shifted from the input; and coupling the phase inverter output to the third motor terminal.

\* \* \* \* \*